(12) United States Patent
Marler, III et al.

(10) Patent No.: US 11,129,325 B2
(45) Date of Patent: Sep. 28, 2021

(54) CONVEYANCE BELT FOR HIGH SPEED PLANTING OF SEEDS

(71) Applicant: Felton, Inc., Londonderry, NH (US)

(72) Inventors: Donald James Marler, III, Emmaus, PA (US); Marc Godin, Manchester, NH (US)

(73) Assignee: Felton, Inc., Londonderry, NH (US)

( * ) Notice: Subject to any disclaimer, the term of this patent is extended or adjusted under 35 U.S.C. 154(b) by 205 days.

(21) Appl. No.: 16/456,782

(22) Filed: Jun. 28, 2019

(65) Prior Publication Data

US 2020/0000017 A1 Jan. 2, 2020

Related U.S. Application Data

(60) Provisional application No. 62/693,097, filed on Jul. 2, 2018.

(51) Int. Cl.
| | | |
|---|---|---|
| *A01C 7/12* | (2006.01) | |
| *A01C 7/04* | (2006.01) | |
| *A01C 7/16* | (2006.01) | |
| *B65G 15/42* | (2006.01) | |
| *B65G 15/34* | (2006.01) | |
| *B65G 47/84* | (2006.01) | |

(52) U.S. Cl.
CPC ............... *A01C 7/127* (2013.01); *A01C 7/04* (2013.01); *A01C 7/125* (2013.01); *A01C 7/16* (2013.01); *B65G 15/34* (2013.01); *B65G 15/42* (2013.01); *B65G 47/841* (2013.01)

(58) Field of Classification Search
CPC ..... A01C 7/04125; A01C 7/126; A01C 7/127; A01C 7/16; A01C 7/20; B65G 15/42; B65G 15/44; B65G 15/58; B65G 17/36; B65G 47/841; B65G 47/842; B65G 47/844

See application file for complete search history.

(56) References Cited

U.S. PATENT DOCUMENTS

| | | | | |
|---|---|---|---|---|
| 3,120,892 | A * | 2/1964 | Henning | B65G 15/58 |
| | | | | 198/803.8 |
| 3,603,450 | A * | 9/1971 | Chamberlain | B65G 15/60 |
| | | | | 198/699.1 |
| 3,968,041 | A * | 7/1976 | De Voss | B65G 51/01 |
| | | | | 210/242.3 |
| 5,275,272 | A * | 1/1994 | Ydoate | B65G 47/841 |
| | | | | 198/367 |
| 6,607,068 | B1 * | 8/2003 | Walther | B65G 17/323 |
| | | | | 198/456 |
| 7,631,606 | B2 | 12/2009 | Sauder et al. | |
| 8,074,586 | B2 | 12/2011 | Garner et al. | |
| 9,578,802 | B2 | 2/2017 | Radtke et al. | |
| 9,936,625 | B2 | 4/2018 | Wendte et al. | |

(Continued)

*Primary Examiner* — Thomas B Will
*Assistant Examiner* — Ian A Normile
(74) *Attorney, Agent, or Firm* — Sheehan Phinney Bass & Green PA (57) ABSTRACT

An endless seed delivery belt includes an inner surface, and an undulating outer surface. The undulating outer surface defines a plurality of alternating, and regularly-spaced peaks and troughs where each peak corresponds to a flight and each space between adjacent peaks defines a cavity that is generally sized and shaped to accommodate one seed. In some implementations, the endless seed delivery belt has a seed ejector between each pair of adjacent flights.

19 Claims, 5 Drawing Sheets

(56) References Cited

U.S. PATENT DOCUMENTS

| | | | |
|---|---|---|---|
| 9,949,426 B2 | 4/2018 | Radtke et al. | |
| 2004/0149545 A1* | 8/2004 | Tarantino | B65G 15/42 |
| | | | 198/690.2 |
| 2009/0020390 A1* | 1/2009 | Webb | B65G 15/58 |
| | | | 193/1 |
| 2010/0021641 A1* | 1/2010 | Pisklak | B05C 19/04 |
| | | | 427/346 |
| 2013/0333602 A1* | 12/2013 | Carr | A01C 21/005 |
| | | | 111/171 |
| 2014/0352844 A1* | 12/2014 | Page | B65B 1/04 |
| | | | 141/114 |
| 2016/0212932 A1* | 7/2016 | Radtke | A01C 7/081 |
| 2018/0162571 A1* | 6/2018 | Nijland | B65G 21/12 |

* cited by examiner

CONVEYANCE BELT FOR HIGH SPEED PLANTING OF SEEDS

CROSS-REFERENCE TO RELATED APPLICATIONS

This application claims the benefit of U.S. Patent Application Ser. No. 62/693,097, filed Jul. 2, 2018, entitled "CONVEYANCE BELT FOR HIGH SPEED PLANTING OF SEEDS," which is incorporated by reference herein in its entirety.

FIELD OF THE INVENTION

This disclosure relates to a conveyance belt for seed delivery and, more particularly, relates to a conveyance belt for high speed planting of seeds (e.g., in a furrow in the ground).

SUMMARY OF THE INVENTION

In one aspect, an endless seed delivery belt includes an inner surface, and an undulating outer surface. The undulating outer surface defines a plurality of alternating, and regularly-spaced peaks and troughs where each peak corresponds to a flight and each space between adjacent peaks defines a cavity that is generally sized and shaped to accommodate one seed. In some implementations, the endless seed delivery belt has a seed ejector between each pair of adjacent flights.

In another aspect, a system for delivering seed includes an endless seed delivery belt that has an inner surface and an undulating outer surface. The undulating outer surface defines a plurality of alternating, and regularly-spaced peaks and troughs where each peak corresponds to a flight and each space between adjacent peaks defines a cavity that is generally sized and shaped to accommodate one seed. There are two (or more) pulleys, to which the endless seed delivery belt is mounted. A cartridge configured to cover at least part of the endless seed delivery belt and to define an input port and outlet port (or paths). A device is configured to deliver seed into an input port of the cartridge. The endless seed delivery belt is configured such that when a particular portion of the belt: a) moves around a first one of the pulleys, near the input port, flights near that portion of the belt separate allowing for easy seed placement into the cavities associated with those flights, b) after moving around the first one of the pulleys, the flights near that portion of the belt move back toward one another, grabbing and clenching the seeds that have been placed in the cavities associated with those flights; and c) moves around a second one of the pulleys, near the outlet port, where the flights near that portion of the belt, again separate allowing for easy release or removal of the seeds from the cavities associated with those flights.

In some implementations of the invention(s) disclosed herein, one or more of the following advantages may be present.

For example, the belt design(s) disclosed herein facilitates high speed delivery of seed into furrows. Moreover, the belt geometries disclosed herein can facilitate the securing of seed during conveyance to the furrow. Some implementations include ejection fingers (or the like) to facilitate and ensure a positive seed release. Some implementations include localized polymer enhancements (e.g., tips) to improve wear (abrasion resistance and reduce friction). Some implementations can help facilitate highly efficient seed delivery. Reinforced structures may facilitate increased belt life and increased cycles between belt replacements. In some implementations, the belt design(s) disclosed herein may produce seed delivery systems that require less energy to operate than other types of seed delivery systems. In some implementations, the belt design(s) disclosed herein facilitate high speed seed delivery in high flex fatigue environments, with potentially long (e.g., 400-800 hours or more) life for the belt(s). In some implementations, a universal belt design may be provided for all, or almost all, seed sizes.

Other features and advantages will be apparent from the description and drawings, and from the claims.

BRIEF DESCRIPTION OF THE DRAWINGS

Like reference characters refer to like elements.

DETAILED DESCRIPTION

Figure 1:
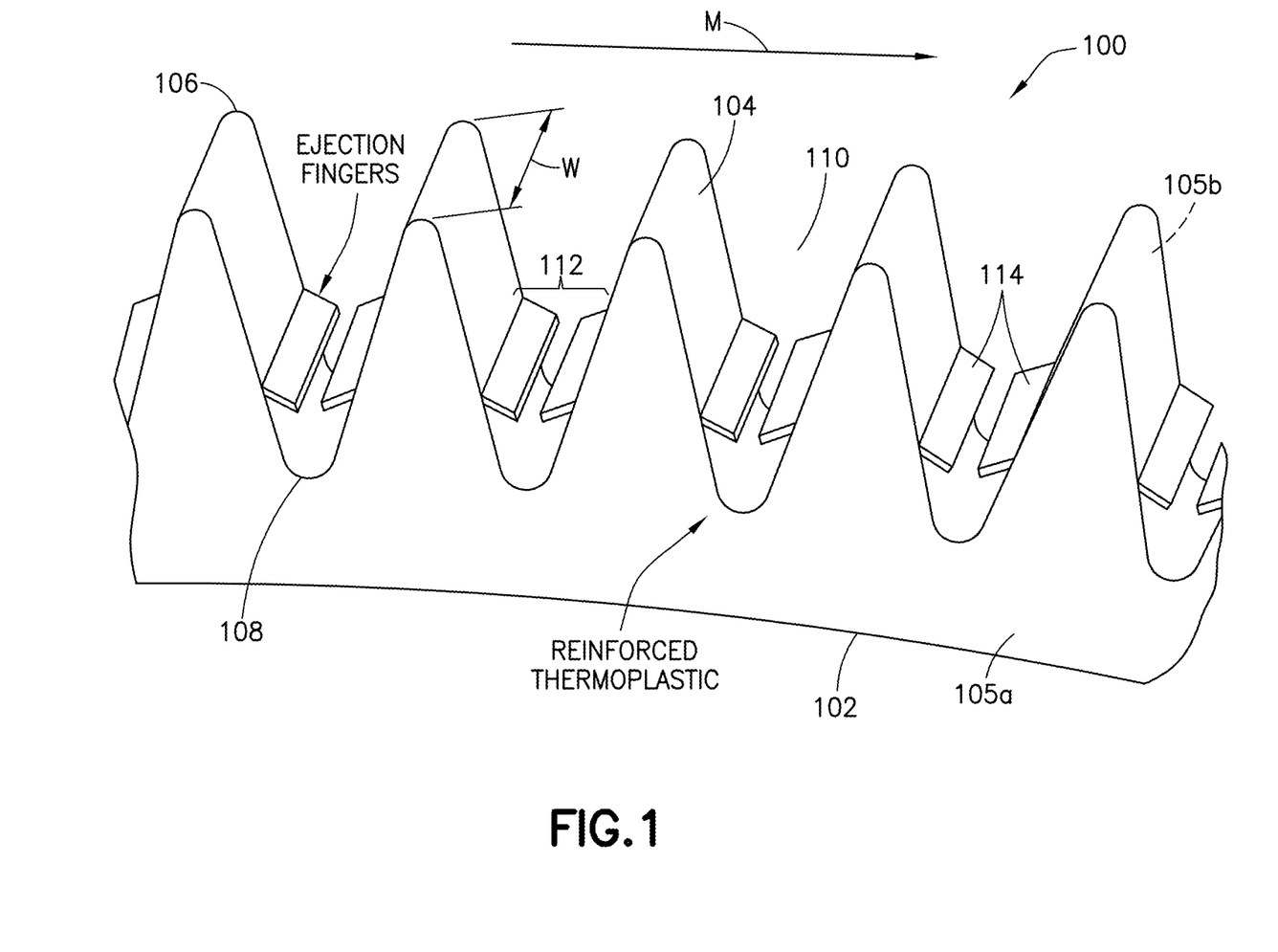
FIG. 1 is a partial perspective view showing one implementation of an endless seed delivery belt configured to facilitate high speed delivery of seed from a seed meter in an agricultural planter, for example, to a furrow.

FIG. 1 is a partial perspective view of an endless seed delivery belt 100 configured to facilitate high speed delivery of seed from a seed meter in an agricultural planter, for example, to a furrow.

The endless seed delivery belt 100 has a flat inner surface 102, an undulating outer surface 104, and a pair of flat side surfaces 105a, 105b, each of which extends between the inner surface 102 and the outer surface 104. The undulating outer surface 104 defines a plurality of alternating, and regularly-spaced peaks 106 and troughs 108. The undulations extend along the outer surface 104 of the belt in a longitudinal direction (i.e., the direction (M) that the belt would be moving around a set of pulleys in an operating agricultural planter, for example). At any point along the longitudinal extent of the belt, the outer surface 104 follows a straight (i.e., non-undulating) line laterally across the belt 100 from side 105a to side 105b. Each side surface 105a, 105b of the belt 100 in the illustrated implementation is completely flat, and the inner surface 102 in the illustrated implementation is completely flat.

In the illustrated implementation, the undulating outer surface follows an approximate saw tooth pattern, but with peaks 106 and troughs 108 that are rounded. Each peak corresponds to a flight (or hill-like structure) and the space between adjacent peaks defines a cavity 110 that is generally sized and shaped to accommodate one seed. The belt 100 also has a width W that helps ensure that the cavity 110 is sized to accommodate one seed.

A seed ejector 112 is provided between each pair of adjacent flights. In the illustrated implementation, each seed ejector 112 consists of a pair of ejection fingers 114. These ejection fingers can be formed from any one or more of a variety of different types of materials. Typically, the material is one that, when shaped to form an ejection finger will have some flexibility. Exemplary materials include thermoplastics, fabric, or rubber. Each pair of ejection fingers 114 includes a first finger that extends from a sloped side surface of a first one of the flights, and a second finger that extends from a sloped side surface of a second one of the flights. There is a small space between the distal ends of the fingers in each pair of ejection fingers 114.

Each ejection finger 114 has a cross-section that forms a quadrilateral (or a trapezoid) and a width that extends across the entire width (W) of the belt 100. Moreover, each ejection finger 114 extends from the corresponding sloped-surface at a line that is located approximately two thirds (+/−5%) of the distance from the peak at the top of the sloped surface to the low point in the trough at the bottom of the sloped surface. This line, where the ejection finger 114 attaches to the flight, is substantially parallel to the peak of the flight across the width (W) of the belt 100, and substantially perpendicular to an intended direction of movement (see arrow M) of the belt 100.

Each ejection finger 114, in the illustrated implementation, extends from its sloped surface in a slightly downward direction. In a typical implementation, when the corresponding belt portion is configured as shown in FIG. 1, each ejection finger is disposed at an angle relative to an intended direction of movement (M) for the belt 100 of at least 10 degrees. In some implementations, this angle is between 40 degrees and 45 degrees. This angle, of course, can vary considerably.

In a typical implementation, during operation, one seed will sit inside each cavity, above the seed ejector 112 while being conveyed.

In a typical implementation, the illustrated belt 100 will be installed into a seed delivery system for a high speed agricultural planter. The belt will be mounted on two (or more) pulleys and may be partially contained within a cartridge (or housing). In a typical implementation, the flights are configured such that the outer tips of the flights (i.e., the peaks of the undulating outer surface) are close to (and, in some instances, touching) an inner surface of the cartridge. This closeness (or touching) helps ensure that a seed that is trapped in one of the cavities cannot escape the cavity until it reaches the designated seed release point in the seed delivery system.

The cartridge typically defines an inlet port (through which a seed, from a seed metering device, can enter one of the cavities in the belt), and an exit port (through which the seed can exit the belt for delivery into a furrow). In some implementations, if the belt is supported on two pulleys, the inlet port may be at (or near) a first one of the pulleys and the outlet port may be at (or near) a second one of the pulleys. In this sort of implementation, as the belt 100 moves around the first pulley, which may have tight radius, flights separate allowing for easy seed placement into a cavity (near the inlet port). At the end of the turn around the pulley, the flights move back towards one another, grabbing and clenching the seed for the conveyance to the outlet port. As the belt 100 moves around the second pulley (near the outlet port), which also may have a tight radius, flights separate again allowing for easy release or removal of the seed. In addition, when the flights separate near the outlet port, the seed ejection fingers 114 flare in an outward direction to help push the seed out of its cavity.

The various dimensions of belt 100, including its undulating outer surface and ejection fingers, can vary depending, for example, on the size and shape of a particular type of seed that is to be handled the belt. That said, in a typical implementation, each flight has a height (measured from peak to bottom of trough) that is between about 1½ inch and 1¼ inches. In some exemplary implementations, the period (i.e., distance between adjacent peaks on the belt when the corresponding belt portion is flat) is between about ¹⁄₁₆ inch and 1 inch (e.g., possibility ¼ inches). In some exemplary implementations, the thickness of the belt (e.g., from the inner surface of the belt to the peak of the flights is between about ¼" and 1½". In some implementation, the width of the belt can be between about 1" and 2". Finally, in some implementations, the length of the belt can be between about 2 feet and 5 feet circumferentially. It is expected that these dimensions (and others indications of size or shape provided herein) will provide for a belt that has seed cavities that are sized and shaped to accommodate most, if not all, seeds that might be popular in high speed planting applications, including, for example, corn and soybean as well as others. Moreover, in a typical implementation, since each cavity is generally somewhat triangular—wide at the top and narrow at the bottom—the cavity may accommodate different seed dimensions, since the seed (depending on its size) will rest at different heights in the cavity.

Figure 2:
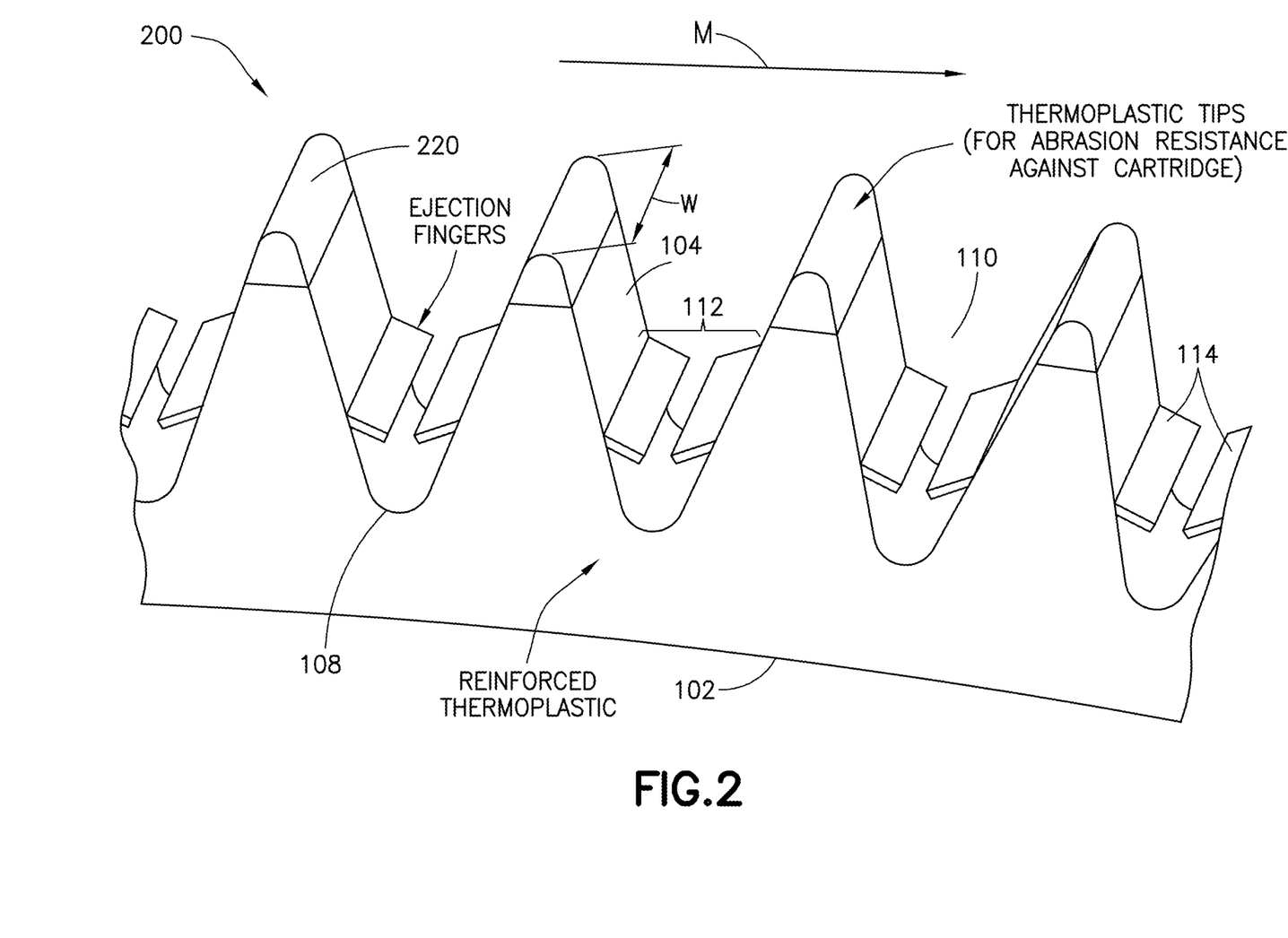
FIG. 2 is a partial perspective view of another implementation of an endless seed delivery belt.

FIG. 2 is a partial perspective view of an alternative implementation of an endless seed delivery belt 200 configured to facilitate high speed delivery of seed from a seed meter in an agricultural planter, for example, to a furrow.

The belt 200 in FIG. 2 is very similar to the belt 100 in FIG. 1. One main difference between the belt 200 in FIG. 2 and the belt 100 in FIG. 1 is that the belt 200 in FIG. 2 has special tips 220 formed at the distal ends of each flight.

In various implementations, these tips may be made from a material that provides a greater degree of abrasion resistance and/or lower friction than whatever material the rest of the belt 200 is made from. In one exemplary implementation, the tips may be made from a thermoplastic, whereas the rest of the belt 200 may be made from rubber.

Figure 3:
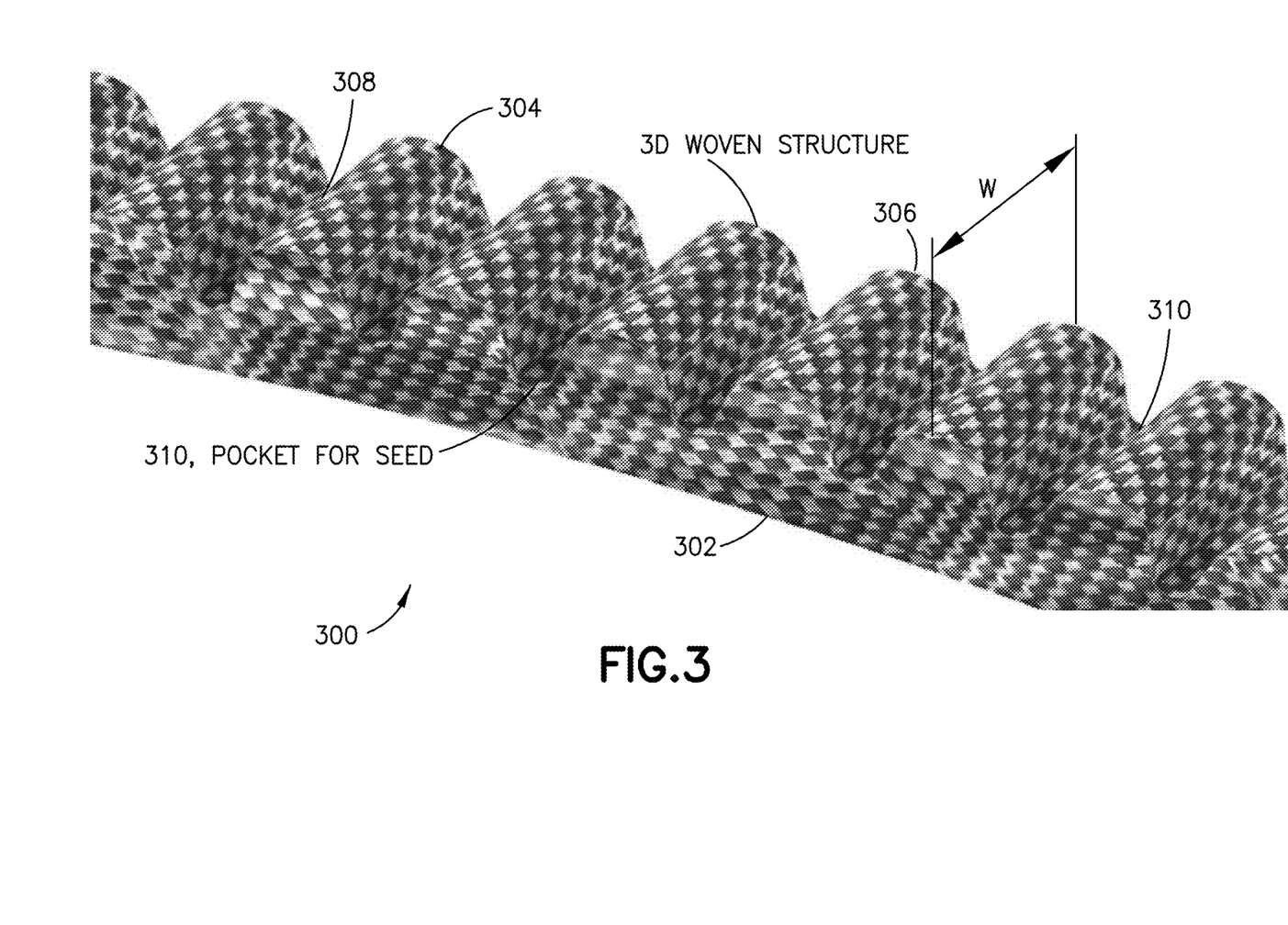
FIG. 3 is a partial perspective view of yet another implementation of an endless seed delivery belt.

FIG. 3 is a partial perspective view of an endless seed delivery belt 300 configured to facilitate high speed delivery of seed from a seed meter in an agricultural planter, for example, to a furrow.

The belt 300 in FIG. 3 is similar in some ways to the belt 100 in FIG. 1. For example, the endless seed delivery belt 300 in FIG. 3 has a substantially flat inner surface 302 and an undulating outer surface 304. The undulating outer surface 304 defines a plurality of alternating, and regularly-spaced peaks 306 and troughs 308. Each peak corresponds to a flight (or hill-like structure) and the space between adjacent peaks defines a cavity 310 that is generally sized and shaped to accommodate one seed. The belt 300 also has a width W that helps ensure that the cavity 310 is sized to accommodate one seed.

The belt 300 in FIG. 3, however, is a woven structure and does not have a seed ejector in the cavities 310. In an exemplary implementation, the woven fabric that forms the belt 300 includes two or more interlaced fabric threads at right angles to one another. The belt 300 in the illustrated implementation is a completely woven belt so one element only using a 3D weaving process. In a typical implementation, the material of the woven belt 300 is a Kevlar or something very strong negating the need for any other elements. The belt 300 in the illustrated implementation does not have any seed ejectors. Without being bound by a particular theory, it is believed that the significantly reduced surface friction of the woven design (in belt 300) versus a thermoplastic design, for example, is enough that the seed does not need any help getting out of the cavity—the thermoplastic tends to hold the seed due to its high surface friction.

Figure 4:
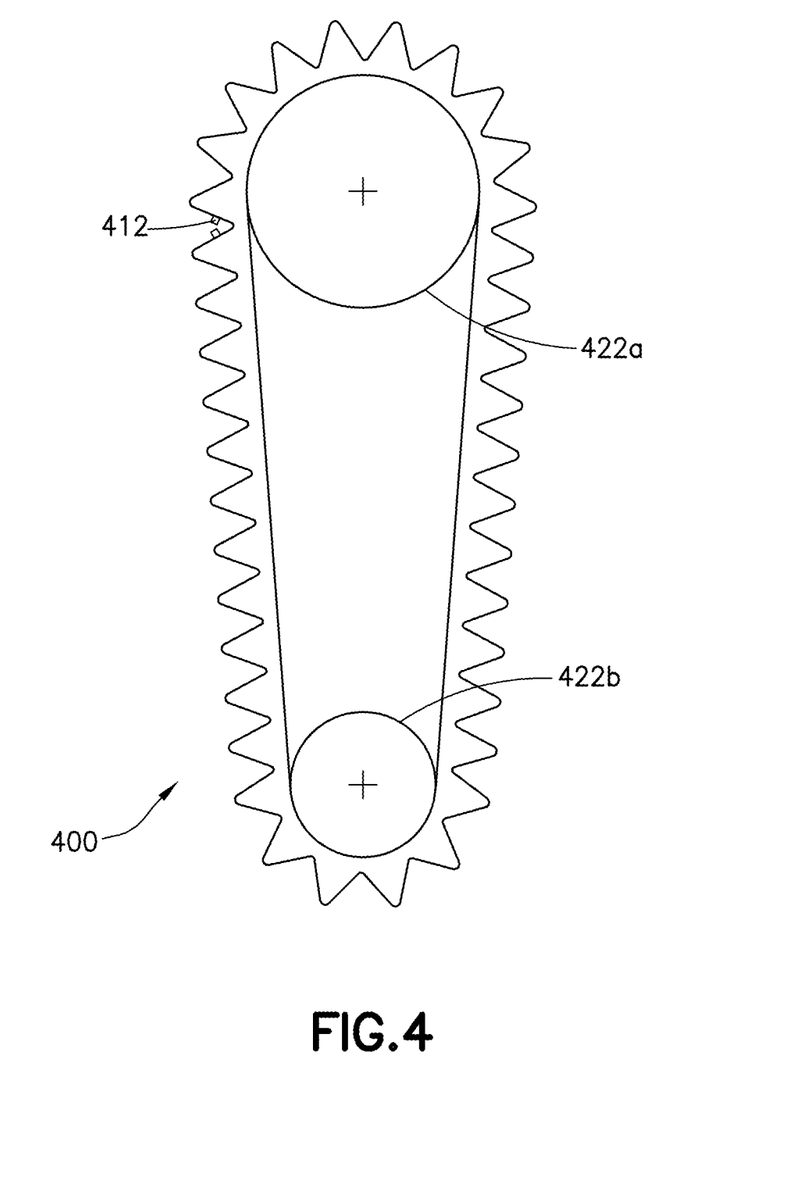
FIG. 4 is a partial schematic side view of an implementation of an endless seed delivery belt supported by a pair of pulleys.

FIG. 4 is a side view of an exemplary belt 400 mounted on a pair of pulleys 422a, 422b. In a typical implementation, each pulley (e.g., 422a) rotates around its axis in the same direction (e.g., clockwise) as the other pulley (e.g., 422b), and this rotating motion causes the belt to move (also in a clockwise direction, in this specific example) around the two pulleys 422a, 422b.

The belt 400 in the illustrated implementation is similar to the belt 100 in FIG. 1. In this regard, for example, the belt 400 has a flat inner surface, an undulating outer surface, and a pair of flat side surfaces, each of which extends between the inner surface and the outer surface. The undulating outer surface defines a plurality of alternating, and regularly-spaced peaks and troughs. The undulations extend along the outer surface 104 of the belt in a longitudinal direction (i.e., the direction that the belt moves around the set of pulleys 422a, 422b). In the illustrated implementation, the undulating outer surface follows an approximate saw tooth pattern. A seed ejector 412 is provided between each pair of adjacent flights (even though only one, typical, seed ejector 412 is shown in the illustration). According to the implementation represented in the figure, each seed ejector 412 has of a pair of ejection fingers.

The flights on the portions of the belt 400 that lie in a relatively flat plane between the upper and lower pulleys 422a, 422b have a first dimension that sized to effectively cradle and hold a seed there between. The flights on the portions of the belt 400 that bend around the pulleys 422a, 422b flare apart. This increases the size of the spaces between adjacent flights so that a seed can be easily placed into one of those spaces (typically near the top pulley 422a), or so that a seed can be released from one of those spaces (typically near the bottom pulley 422b).

Any one of the belt designs disclosed herein can be incorporated into any one of several different types of seed delivery machines. One example of such a machine is disclosed in U.S. Pat. No. 9,578,802, which is incorporated herein by reference in its entirety. Another example of such a machine is disclosed in U.S. Pat. No. 8,074,586 (see, e.g., FIG. 3, in particular), which also is incorporated herein by reference in its entirety. Yet another example of such a machine is shown, in partial schematic cross-section, in FIG. 5 of the current application, which is similar in some ways to the seed delivery apparatus in FIG. 3 of U.S. Pat. No. 8,074,586, but includes the belt 400 from FIG. 4 of the current application.

Figure 5:
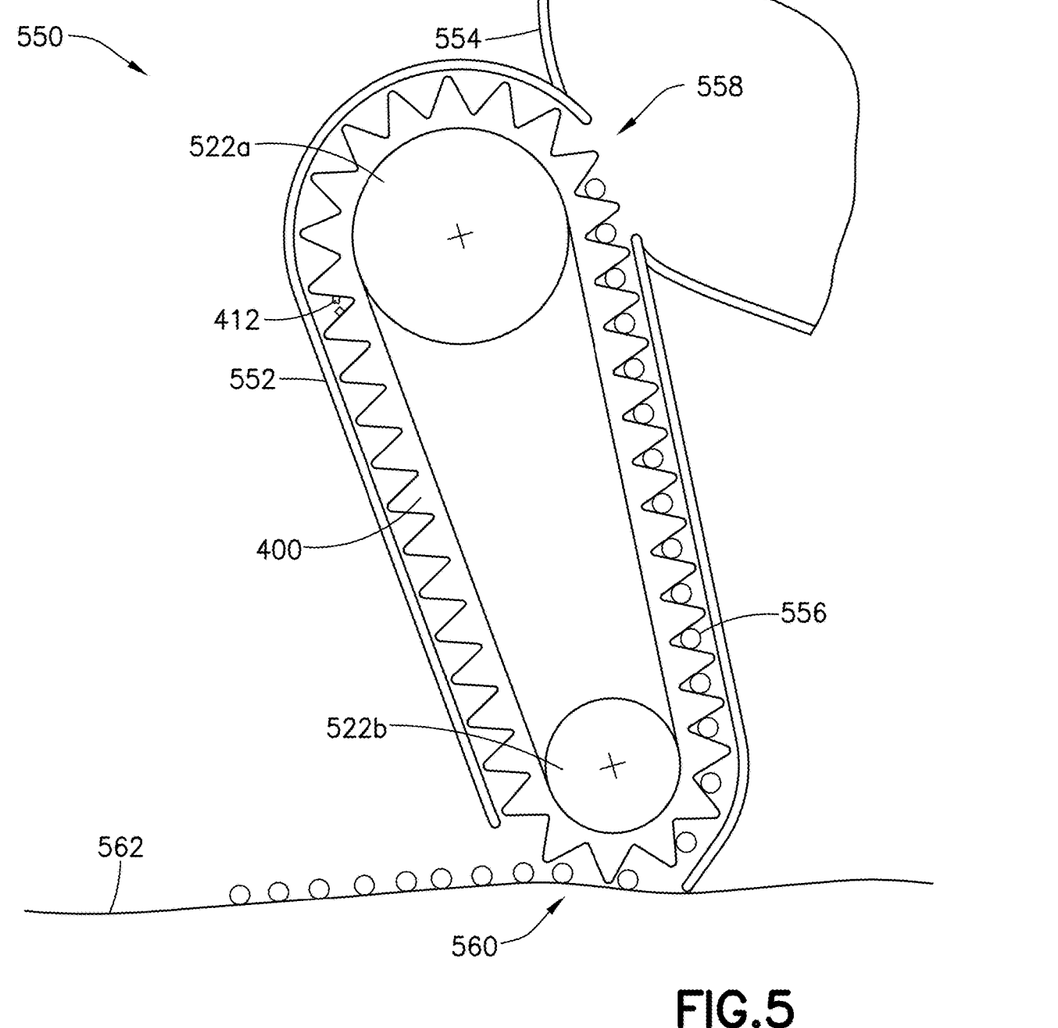
FIG. 5 is a partial schematic, cross-sectional view of a seed delivery machine that includes an implementation of an endless seed delivery belt.

FIG. 5 shows a seed delivery apparatus 550 that includes a housing 552 next to a seed source 554. The seed source 554 is operational to deliver seed to the belt 400 inside the housing 552.

The seed source 554 may be virtually any kind of machine or assembly that can deliver seed to the belt 400 in the housing 552. In one such example, like the one shown in FIG. 3 of U.S. Pat. No. 8,074,586, the seed source includes a rotating seed disk of a seed meter. The seed disk may be a substantially flat disk with multiple apertures adjacent to a periphery of the disk. During system operation, seeds 556 may be collected on the apertures from a seed pool and adhered to the disk (e.g., by differential air pressure applied to opposite sides of the seed disk.

The housing 552 of the seed delivery apparatus 550 has right and left laterally spaced opposite walls and a side wall extending between them. There is an opening 558 at an upper portion of the side wall configured to facilitate seed admission from the seed meter into the housing 552, and an opening 560 at a lower portion of the side wall of the housing 552 to facilitate seed livery into a trench, for example.

A pair of pulleys 522a, 522b is mounted inside the housing 552 and supports the belt 400, which is mounted thereto. The pulleys include a larger, upper pulley and a lower, smaller pulley. One of the pulleys (e.g., 522a) is a drive pulley while the other pulley is an idler pulley.

The opening 560 at the lower portion of the side wall of the housing 552 may be positioned close to the bottom of the seed trench. In some implementations, during use, the lower opening 560 is near or below the soil surface 562 at the trench. The housing side wall forms an exit ramp at the lower opening 560.

In some implementations, such as the one in FIG. 3 of U.S. Pat. No. 8,074,586, the seed source 554 has a loading wheel next to the upper opening 558 of the housing 552. There may be recesses in the bottom surface of the loading wheel (facing the seed disk). These recesses may be sized and arranged to receive seed agitators that project from the seed disk. Those moving agitators engage the recesses in the loading wheel and drive the loading wheel in a rotating fashion.

During system operation, seed from the seed source 554 is captured by the belt 400 inside the housing 552. The belt 400 then moves in a downward direction carrying the seed to a seed discharge point (at/near the lower opening 560 in the side wall of the housing 552), where the seed is discharged from the housing 552 into a trench in the earth. From the seed meter to the discharge point, the seed is largely held in place (relative to the belt) by the flights on the belt 400 and by the side wall of the housing 552.

Near the upper end of the belt 400 (as the belt 400 is finishing its traverse around the upper pulley 522a), the flights are changing from a flared configuration and beginning to move closer together. This happens where the seed is being placed between adjacent flights and helps the belt 400 to grip the seed as it is being placed on the belt 400 between flights. The spacing between adjacent flights remains relatively constant as the portion of the belt holding a seed travels between the pulleys. When that portion of the belt reaches the lower pulley 522b and starts to turn around the lower pulley 522b, the flights on that portion of the belt start to flare out again (tending to loosen the belt's grip on the seed) and the seed ejectors 412 start to flare outward (tending to push the seed out of engagement with the belt). The seed is released from the belt and dropped out of the lower opening 560 of the housing 552.

A number of embodiments of the invention have been described. Nevertheless, it will be understood that various modifications may be made without departing from the spirit and scope of the invention.

For example, the belts can be manufactured in a number of different ways. For example, in some implementations, the belt 100 is molded. The molding may be a one-step injection molding technique that forms the entire belt including the ejection fingers. In this regard, the ejection fingers might be made of the same material as the rest of the belt 100. As another example, the belt 200 may be made using a multi-step injection molding technique. For example, one step may be used to form everything (out of one material) except for the tips, and a second step may be used to form the tips.

In various implementations, the molded belt(s) disclosed herein can be made from a variety of different materials or combinations of materials including, for example, nylon, polyester, polypropylene, elastomers, thermoplastic vulcanizate, Santoprene™, rubber, etc. The woven belt(s) disclosed herein are generally made of one or more materials that have high flex fatigue resistance and high abrasion resistance. In various implementations, the woven belt(s) disclosed herein can be made from a variety of different materials or combinations of materials, including, for example, Vectran™, Kevlar®, etc.

In some implementations, a base portion of the belt (between the troughs and the inner surface of the belt) is reinforced. For instance, in some implementations, the thickness of this portion of the belt may be reinforced with a nylon or Vectran™.

Figure 6:
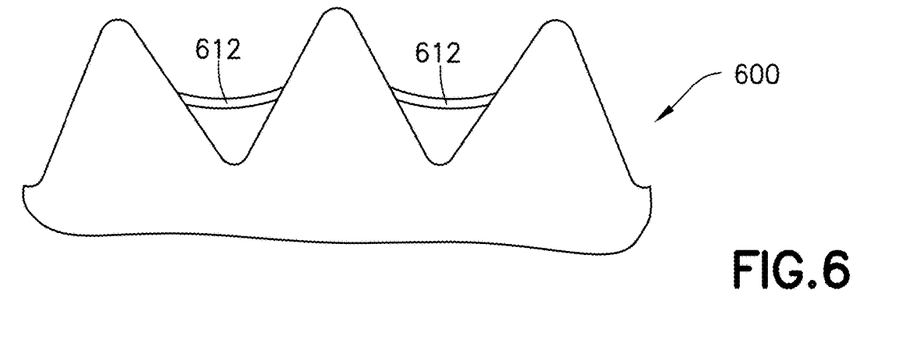
FIG. 6 is a partial schematic side of still another implementation of an endless seed delivery belt.

The seed ejectors can vary from what is shown in the drawings herein. For example, the drawings (FIGS. 1 and 2) show a space between the distal ends of the two ejection fingers in one cavity. In some implementations, each seed ejector may be formed by a single piece of thermoplastic material, fabric or rubber (or some other material) that extends from one sloped surface (of a first flight) to the other sloped surface (of the second flight) without breaks. An example of this is shown in FIG. 6, which is a side view of a portion of a belt 600 that is similar to the belt 100, for example, except that it includes a seed ejector 612 formed from a single piece material rather than a pair of ejection fingers. In some such implementations, the single piece of material may be sized so that it is a little slack when the belt is travelling along a flat extent (e.g., as shown in the figures), but becomes taut where the belt turns around a pulley and the flights separate.

The specific geometry of the undulating surface can vary considerably. For example, the angle of each sloped surface can vary, the degree of rounding at the top of each flight can vary, the degree of rounding at the bottom of each trough can vary, the height of the flights above the troughs can vary, and even the overall shape of each individual flight can vary. Moreover, in some implementations, the undulating surface can follow a substantially sinusoidal (or other) waveform.

The designs disclosed herein are generally useful in high speed seed delivery applications. High speed seed delivery applications generally include belt speeds of around 500-1000 revolutions per minute (RPMs). However, that too can vary. Indeed, the belt designs disclosed herein can be utilized in slower seen delivery applications.

It should be understood that relative terminology used herein, such as "upper", "lower", "above", "below", "front", "rear," etc. is solely for the purposes of clarity and is not intended to limit the scope of what is described here to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to mean completely and almost completely (e.g., for a measurable quantity this might mean, for example, 99% or more, 95% or more, 90% or more, 85% or more). For non-measurable quantities (e.g., a surface that is substantially parallel to another surface), substantial should be understood to mean completely or almost completely.

Other implementations are within the scope of the claims.

What is claimed is:

1. An endless seed delivery belt comprising:
an inner surface;
an undulating outer surface, wherein the undulating outer surface defines a plurality of alternating, and regularly-spaced peaks and troughs where each peak corresponds to a flight and each space between adjacent peaks defines a cavity that is sized and shaped to accommodate one seed;
a seed ejector between each pair of adjacent flights, wherein the seed ejector comprises:
a pair of ejection fingers, wherein each pair of ejection fingers comprises:
a first finger that extends from a sloped side surface of a first one of the flights, and
a second finger that extends from a sloped side surface of a second one of the flights,
wherein the first one of the flights is adjacent the second one of the flights.

2. The endless seed delivery belt of claim 1, further comprising:
a space between a distal end of the first finger and a distal end of the second finger.

3. The endless belt of claim 1, wherein the endless belt is molded and made from nylon, polyester, polypropylene, elastomer, thermoplastic, vulcanizate, thermoplastic vulcanizate, rubber, or a combination thereof.

4. The endless belt of claim 3, wherein a base portion of the belt, between the troughs and the inner surface of the belt, is reinforced.

5. The endless belt of claim 4, wherein the base portion of the belt is reinforced with a nylon or polymer fiber.

6. The endless belt of claim 1, further comprising a tip at a distal end of each flight.

7. The endless belt of claim 6, wherein the tips are made from a material that provides a greater degree of abrasion resistance and/or lower friction than a material that other parts of the belt are made from.

8. The endless belt of claim 1, wherein the endless belt is woven from a polymer fiber.

9. A system for delivering seed, the system comprising:
an endless seed delivery belt comprising:
an inner surface; and
an undulating outer surface, wherein the undulating outer surface defines a plurality of alternating, and regularly-spaced peaks and troughs where each peak corresponds to a flight and each space between adjacent peaks defines a cavity that is generally sized and shaped to accommodate one seed;
two or more pulleys, wherein the endless seed delivery belt is mounted onto the two or more pulleys;
a cartridge configured to cover at least part of the endless seed delivery belt and to define an input port and outlet port; and
a device configured to deliver seed into an input port of the cartridge;
wherein the endless seed delivery belt is configured such that when a particular portion of the belt:
moves around a first one of the pulleys, near the input port, flights near that portion of the belt separate to facilitate seed placement into the cavities associated with those flights,
wherein, after moving around the first one of the pulleys, the flights near that portion of the belt move back toward one another, grabbing and clenching the seeds that have been placed in the cavities associated with those flights; and
moves around a second one of the pulleys, near the outlet port, where the flights near that portion of the belt, again separate to facilitate release or removal of the seeds from the cavities associated with those flights,
wherein the endless seed delivery further comprises:
a seed ejector between each pair of adjacent flights, and
wherein the seed ejector comprises:
a pair of ejection fingers, wherein each pair of ejection fingers comprises
a first finger that extends from a sloped side surface of a first one of the flights, and a second finger that extends from a sloped side surface of a second one of the flights,
wherein the first one of the flights is adjacent the second one of the flights.

10. The system of claim 9, wherein each pair of seed ejection fingers is configured such that, when the flights that surround the pair of seed ejection fingers separate near the outlet port, those seed ejection fingers flare in an outward direction to help push the seed out of the cavity.

11. The system of claim 9, further comprising a space between a distal end of the first finger and a distal end of the second finger.

12. The system of claim 9, wherein the endless belt is molded or made from nylon, polyester, polypropylene, elastomer, thermoplastic, vulcanizate, thermoplastic vulcanizate, rubber, or a combination thereof.

13. The system of claim 9, wherein the endless belt further comprises:
a tip at a distal end of each flight,
wherein the tips are made from a material that provides a greater degree of abrasion resistance and/or lower friction than whatever material other parts of the belt are made from.

14. The system of claim 13, wherein the flights are configured such that outer tips of the flights are close to, or touching an inner surface of the cartridge.

15. The system of claim 14, wherein the outer tips of the flights are close enough to the inner surface of the cartridge to ensure that a seed that is trapped in one of the cavities cannot escape the cavity between a tip and the cartridge, until the seed reaches a designated seed release point in the seed delivery system near the outlet port.

16. The system of claim 9, wherein the endless belt is woven from a polymer fiber.

17. An endless seed delivery belt comprising:
an inner surface;
an undulating outer surface, wherein the undulating outer surface defines a plurality of alternating, and regularly-spaced peaks and troughs where each peak corresponds to a flight and each space between adjacent peaks defines a cavity that is sized and shaped to accommodate one seed; and
a seed ejector between each pair of adjacent flights,
wherein each seed ejector is formed from a single piece of material that extends from a sloped side surface of a first one of the flights to a second sloped side surface of a second one of the flights.

18. The endless seed delivery belt of claim 17 wherein the single piece of material that forms the seed ejector is sized to be slack when the belt is travelling along a flat, or substantially flat, extent, but to become taut when a portion of the belt associated with the seed ejector turns around a tight radius and the flights flare away from each other.

19. A system for delivering seed, the system comprising:
an endless seed delivery belt comprising:
an inner surface; and
an undulating outer surface, wherein the undulating outer surface defines a plurality of alternating, and regularly-spaced peaks and troughs where each peak corresponds to a flight and each space between adjacent peaks defines a cavity that is generally sized and shaped to accommodate one seed;
two or more pulleys, wherein the endless seed delivery belt is mounted onto the two or more pulleys;
a cartridge configured to cover at least part of the endless seed delivery belt and to define an input port and outlet port; and
a device configured to deliver seed into an input port of the cartridge;
wherein the endless seed delivery belt is configured such that when a particular portion of the belt:
moves around a first one of the pulleys, near the input port, flights near that portion of the belt separate to facilitate seed placement into the cavities associated with those flights,
wherein, after moving around the first one of the pulleys, the flights near that portion of the belt move back toward one another, grabbing and clenching the seeds that have been placed in the cavities associated with those flights; and
moves around a second one of the pulleys, near the outlet port, where the flights near that portion of the belt, again separate to facilitate release or removal of the seeds from the cavities associated with those flights,
wherein the endless seed delivery further comprises:
a seed ejector between each pair of adjacent flights,
wherein each seed ejector is formed from a single piece of material that extends from a sloped side surface of a first one of the flights to a second sloped side surface of a second one of the flights, and
wherein the single piece of material is sized to be slack when the belt is travelling along a flat, or substantially flat, extent, but to become taut when a corresponding portion of the belt turns around any one of the pulleys.

* * * * *